United States Patent [19]

Lanka

[11] Patent Number: 4,524,591
[45] Date of Patent: Jun. 25, 1985

[54] LOCK DEVICE FOR CHAIN DRIVEN VEHICLES

[76] Inventor: Richard I. Lanka, 28952 Homewood Dr., Wickliffe, Ohio 44092

[21] Appl. No.: 454,857

[22] Filed: Dec. 30, 1982

[51] Int. Cl.³ .............................................. E05B 67/22
[52] U.S. Cl. ........................................... 70/236; 70/39
[58] Field of Search ................... 70/39, 233, 236, 227, 70/228, 26

[56] References Cited
U.S. PATENT DOCUMENTS
1,461,725  7/1923  Cooper ..................................... 70/39

Primary Examiner—Robert L. Wolfe
Attorney, Agent, or Firm—Watts, Hoffmann, Fisher & Heinke Co.

[57] ABSTRACT

A lock device of the type for use for locking engagement with a drive chain of a vehicle, such as a bicycle, motorcycle, moped or the like, which includes a locking plate member having at least one elongated locking pin element and with an outer protective flange-like shield for locking and unlocking the chain upon actuation of a keylock mechanism.

2 Claims, 13 Drawing Figures

LOCK DEVICE FOR CHAIN DRIVEN VEHICLES

TECHNICAL FIELD

The present invention is directed generally to the field of lock devices and more particularly to a chain lock device of the type which is adapted to engage and lock the chain of a vehicle, such as a bicycle, motorcycle, motor bike, moped or the like, to prevent rotational movement of the chain drive and hence, to minimize efforts to commit theft.

BACKGROUND OF THE INVENTION

Heretofore, there have been provided various types of bar, link and other articulated mechanisms for preventing the theft of vehicles, such as bicycles, motorcycles, motor bikes, mopeds and the like. Such devices have ranged from the very complex to the very simple such as that which is identified as bike chain locks. These locks have generally included a flexible belt, strap or chain which has an integral pad-lock mechanism for locking the free ends of the chain together so that the chain can be looped around the wheel, for example, of the vehicle and then attached around a fixed part of the vehicle frame.

More recently, there has been provided a chain lock which incorporates a main body having at one end a plate detachably secured thereto and which with the body defines a channel to receive the chain which is engaged by a pair of prongs which are secured by a manually operable lock mechanism disposed in the body. Such chain lock device is disclosed, for example, in U.S. Pat. No. 4,019,354. Other lock devices are further illustrated, for example, in U.S. Pat. Nos. 60,454, 587,456 and 3,754,420.

SUMMARY OF THE INVENTION

The present invention provides a chain lock device and more particularly provides a new and improved chain lock device which is adapted to engage especially the master link of the chain, such as on a bicycle, motorcycle, motor bike or moped, to prevent any substantial rotational movement of the chain so that it cannot be readily driven as in the case of a theft or the like. In such cases, the device acts to provide a considerable safeguard to slow-up the would be thief thereby to minimize the probability of theft.

Other objects and advantages of the invention will become apparent as the following description proceeds when taken in conjunction with the accompanying drawings.

DESCRIPTION OF THE PREFERRED EMBODIMENTS

Figure 1:
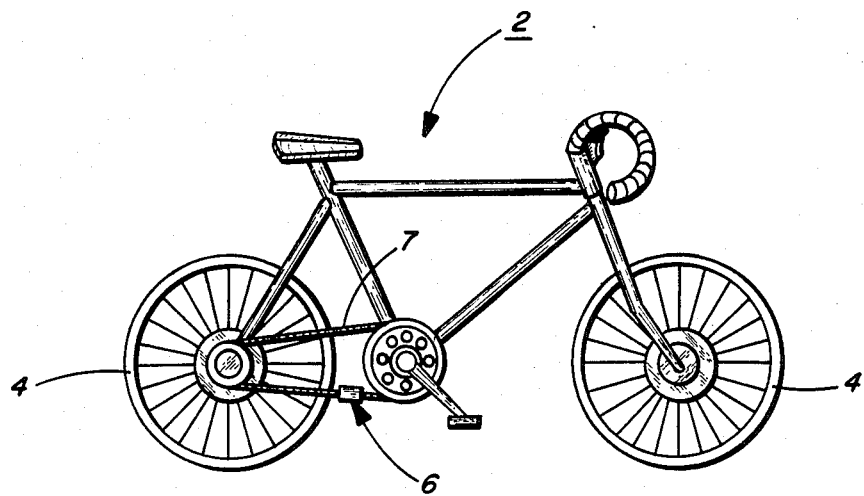
FIG. 1 is a side elevation view illustrating the lock device of the present invention mounted on a chain drive of a bicycle.

Referring again to the drawings, and in partcular to FIG. 1 thereof, there is illustrated a conventional type of bicycle, designated generally at 2, which has a chasis mounted on wheels. The locking device of the invention, designated generally at 6, is illustrated in locking position on the drive chain 7 of the bicycle.

Figure 2:
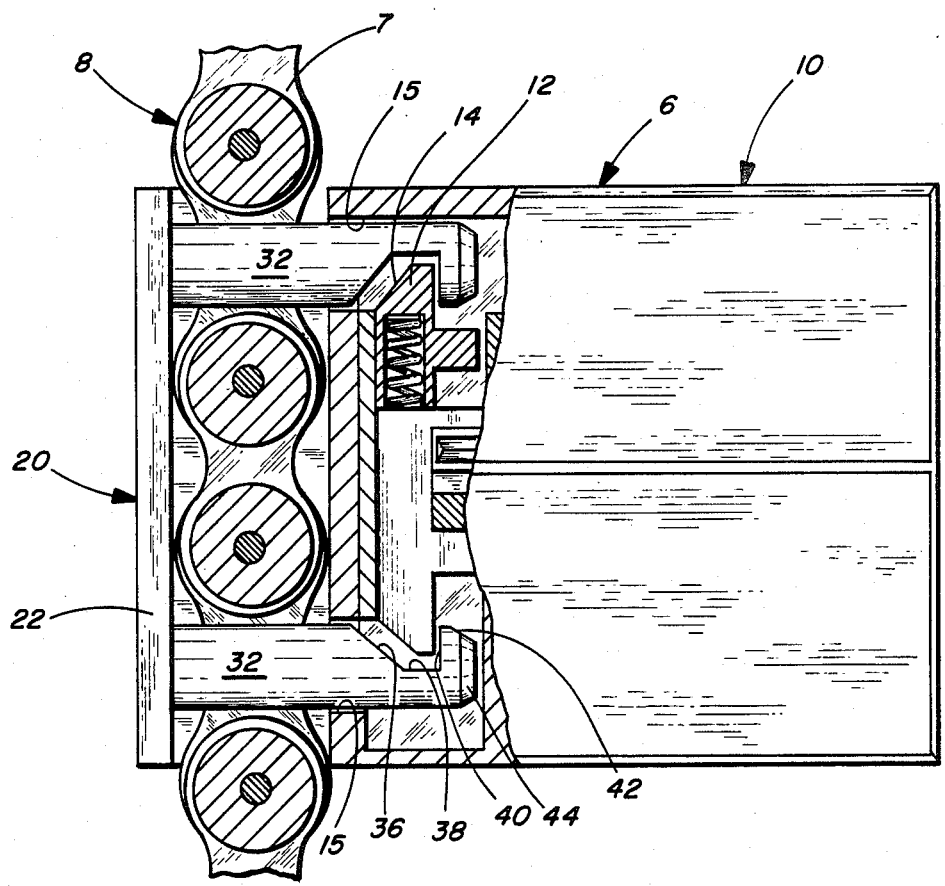
FIG. 2 is a fragmentary, side elevation view, partly in section, on an enlarged scale illustrating the locking device of the invention in one form thereof.
Figure 3:
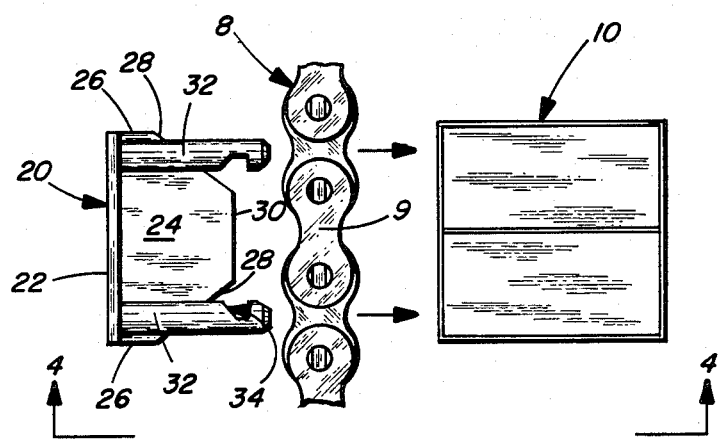
FIG. 3 is a fragmentary, side elevation view, on a reduced scale, showing the disassembled position of the lock device of the invention.

As illustrated in FIGS. 2 and 3, the locking device 6 is constructed and arranged so as to be especially used with the master link 8 of the chain 7. That is, the link that joins the chain 7 into an endless loop construction, as known in the art. The locking device 6 includes an elongated, generally rectangular housing 10 which has a conventional key-lock internal mechanism which may have a conventional cylinder and tumbler construction disposed within a cavity 15 provided in the housing 10. The cylinder has a spring-loaded arm 12 which is rotated into and out of locking engagement with the locking plate 20 of the lock device 6. For this purpose, the arm 12 has a tapered configuration, as at 14, so as to fit within correspondingly shaped recessed slots provided in the pin elements 32 of the locking plate 20.

As shown in FIGS. 3 through 8, the locking plate member 20 has a flat base plate portion 22 which has an integral side flange portion 24 bent at right angles thereof and extending downwardly in a direction toward the lock housing 10. The side plate portion is spaced laterally from the pin elements 32 and provides, in effect, a skirt portion which gives an outer protective shield for concealing the drive chain 7 in the installed position thereof. Accordingly, in FIG. 1 an outer protective skirt-like flange 24 would be seen on the outside in protective relation over the drive chain 7. This arrangement provides a generally L-shaped construction with the flange 24 having linear side portions 26 which merge into tapered convergent side portions 28 which, in turn, merge into a flat end edge 30 which extends parallel to the base plate 22.

Now in the invention and in the embodiment illustrated in FIGS. 2 through 8, there is shown a pair of oppositely disposed pin elements 32 which extend in parallel relationship down from the base plate 22 and through openings 33 in the housing. The pin elements are of an elongated solid cylindrical construction having a length greater than the corresponding transverse dimension of the flange 24. The pin elements 32 are of an identical construction each having a recessed slot, as at 34, adjacent its end. Each slot 34 is defined by an inclined cam surface 36 which merges into a flat bottom surface 38 (FIG. 2) which then, in turn, merges into a flat bottom surface 40 extending at right angles thereto. The surface 40 then merges into an outer inclined surface 42 which extends generally parallel to the inclined surface 36 so as to provide a slide-action on the confronting inclined surface 14 of the spring-loaded pivot arm 12. The pin elements may terminate in a frustroconical nose portion, as at 44, to facilitate entry of the respective pin elements through the associated openings provided in the master link 8 of the drive chain 7.

Figure 4:
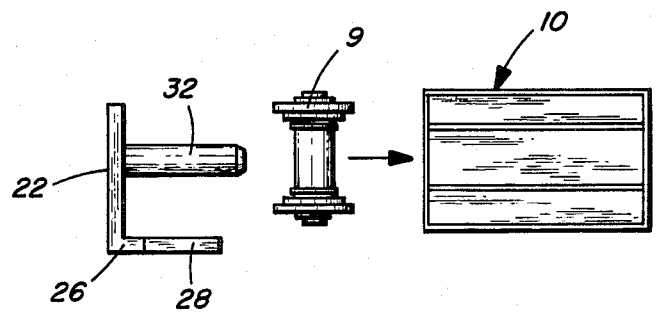
FIG. 4 is generally an assembly view looking in the direction of the line 4—4 of FIG. 3.
Figure 5:
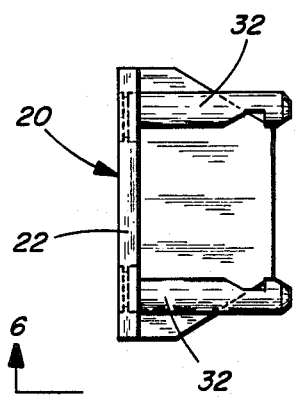
FIG. 5 is a top plan view of the detachable locking plate in one form of the invention.
Figure 6:
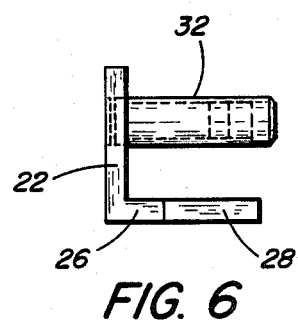
FIG. 6 is an end elevation view of the locking plate illustrated in FIG. 5 and looking in the direction of the line 6—6.
Figures 7, 8:
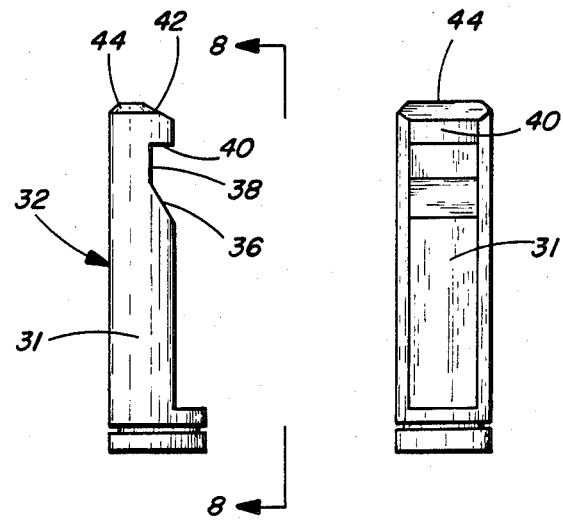
FIG. 7 is a side elevation view, on an enlarged scale, of one of the locking pin elements of the invention.
FIG. 8 is a side elevation view looking along the line 8—8 of the pin element of FIG. 7.
Figure 9:
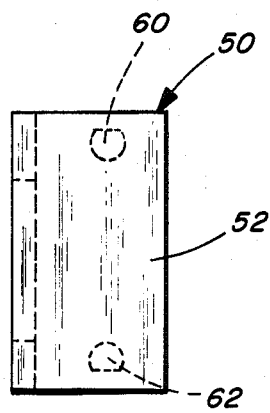
FIG. 9 is a top plan view of a modified form of the locking plate of the invention.
Figure 10:
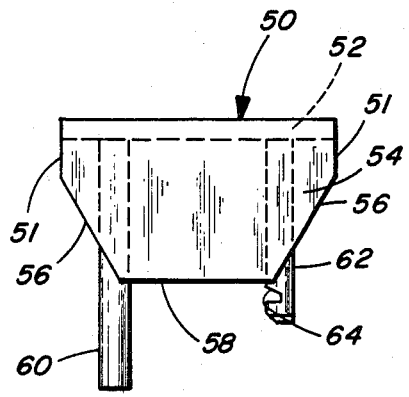
FIG. 10 is a side elevation view of the locking plate of FIG. 9 looking from the left hand side thereof.
Figure 11:
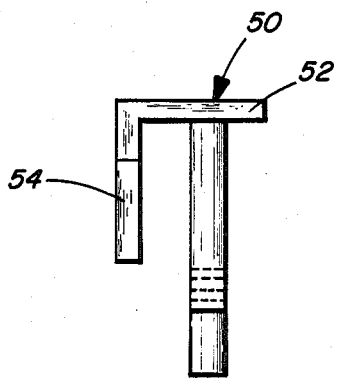
FIG 11 is an end elevation view of the locking plate of FIG. 10 looking from the right hand side thereof.
Figure 12:
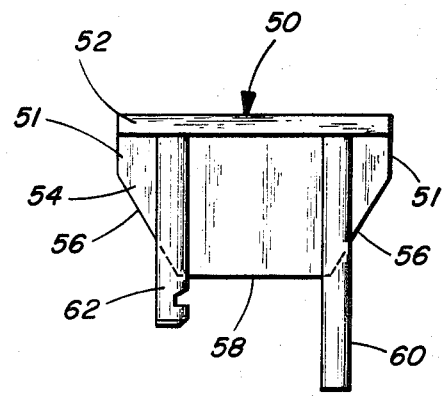
FIG. 12 is a rear view of the locking plate illustrated in FIG. 10.
Figure 13:
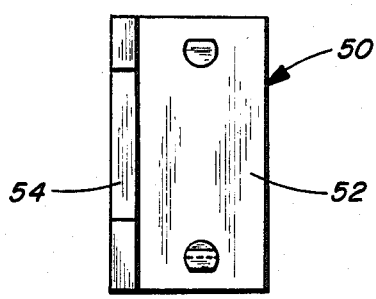
FIG. 13. is a bottom view of the locking plate illustrated in FIG. 9.

In FIGS. 3 and 4 the master link, as at 9, is illustrated for connecting the drive chain portions together.

In FIGS. 9 through 13 there is illustrated a modified form of the locking plate, designated generally at 50, in accordance with the invention. In this arrangement, the construction is generally identical except that there is only one locking pin element but used in combination with a guide pin. In this embodiment, the locking plate member 50 includes a base plate 52 with an integral depending side flange portion 54 which provides a protective skirt, as aforesaid. The side plate portion 54 has linear and parallel side edges 51 which merge into inclined convergent side edges 56 which merge into a bottom edge 58 (FIG. 10) that extends parallel to the base 52. In this form, the locking pin element 62 is of identical construction as the locking pin elements 32 in the embodiment of FIG. 2 and having the recessed slot 64 for the purposes, as aforesaid. In this form, an elongated cylindrical guide pin 60 is provided to have a guiding function rather than being locked by the spring-loaded arm of the lock mechanism. For this purpose, the guide element 60 extends parallel to the locking pin element 62 and has a greater length thereof so as to freely pass through the link openings and be received within the cavity of the housing.

Other further advantages and objects of the present invention will become apparent when taken in conjunction with the accompanying claims.

I claim:

1. A locking device of the type adapted to engage the links of a drive chain of a vehicle, such as a bicycle, motorcycle, moped of the like, comprising a lock mechanism having a hollow housing mounting a key actuated tumbler means having a locking arm means adapted to be moved between a locked and an unlocked position, said housing having a pair of oppositely disposed openings adapted to provide ingress and egress into the housing, a locking plate member including a flat base plate portion and an integral downwardly depending side plate portion defining an L-shaped configuration in side elevation providing a protective outer skirt, at least one elongated locking pin element made integral with and extending downwardly from said base plate portion and parallel to said side plate portion and spaced laterally from said side plate portion, said locking pin element having a recessed slot adapted to receive therein the confronting end portion of said locking arm of said lock mechanism.

2. A locking device in accordance with claim 1, wherein said locking plate member includes a pair of locking pin elements extending downwardly and in parallel relationship from said base plate portion.

* * * * *